(12) United States Patent
Pangallo et al.

(10) Patent No.: US 7,240,700 B2
(45) Date of Patent: Jul. 10, 2007

(54) NOISE BLOCKING DRAIN PLUG

(75) Inventors: Christopher Michael Pangallo, Chicago, IL (US); Duane M. Schultz, Lansing, IL (US)

(73) Assignee: Illinois Tool Works Inc, Glenview, IL (US)

( * ) Notice: Subject to any disclaimer, the term of this patent is extended or adjusted under 35 U.S.C. 154(b) by 199 days.

(21) Appl. No.: 11/098,331

(22) Filed: Apr. 4, 2005

(65) Prior Publication Data

US 2006/0220376 A1 Oct. 5, 2006

(51) Int. Cl.
B65B 1/04 (2006.01)

(52) U.S. Cl. .................... 141/98; 141/65; 296/208; 285/140.1; 285/210; 285/921

(58) Field of Classification Search ............ 141/65, 141/286, 302, 383–386, 98; 296/208; 285/140.1, 285/210, 921
See application file for complete search history.

(56) References Cited

U.S. PATENT DOCUMENTS

| | | | | |
|---|---|---|---|---|
| 2,180,960 A | * | 11/1939 | Kennedy | 285/192 |
| 2,253,818 A | | 8/1941 | Simon | |
| 2,472,569 A | * | 6/1949 | Caldwell et al. | 285/210 |
| 2,991,120 A | | 7/1961 | Barenyi | |
| 3,650,551 A | * | 3/1972 | Akers | 285/143.1 |
| 4,071,273 A | | 1/1978 | Hack et al. | |
| 4,892,351 A | | 1/1990 | Ono et al. | |
| 5,439,256 A | * | 8/1995 | Brainard | 285/200 |
| 5,527,081 A | | 6/1996 | Rausch et al. | |
| 5,826,855 A | * | 10/1998 | Dick | 251/144 |
| 5,951,059 A | * | 9/1999 | Kitamura | 285/24 |
| 6,450,563 B2 | | 9/2002 | Yee | |
| 6,585,297 B2 | * | 7/2003 | Mullen, Jr. | 285/149.1 |
| 6,641,202 B2 | | 11/2003 | Graf et al. | |

FOREIGN PATENT DOCUMENTS

| | | |
|---|---|---|
| JP | 63151557 A | 6/1988 |
| JP | 6-227433 | 8/1994 |

* cited by examiner

Primary Examiner—Steven O. Douglas
(74) Attorney, Agent, or Firm—Mark W. Croll; Paul F. Donovan

(57) ABSTRACT

The present invention is directed to a system for reducing the noise that enters the vehicle compartment through a hole in a drain plug. In an embodiment, the system includes a drain plug with a washer, a shank with an inlet fluidly coupled to an outlet, a cylindrical wall and a disc configured to occlude the outlet. The assembly may include a seal. When installed, the seal seals the washer to the mounting surface while the disc occludes the outlet so as to reduce the entry of noise through the drain plug while providing a passageway that allows the accumulated water to drain away.

20 Claims, 3 Drawing Sheets

NOISE BLOCKING DRAIN PLUG

FIELD OF THE INVENTION

The present invention relates generally to a drain plug and more particularly to a drain plug designed to reduce the transmission of exterior noise into the passenger compartment of an automobile.

BACKGROUND OF THE INVENTION

As is known, automobiles are designed to protect automobile occupants from the elements. For example, vehicles can be equipped with one or more sunroofs so that the passengers may enjoy many of the benefits of open air driving while avoiding many of the undesirable aspects to exposure to the elements. If the vehicle encounters rain, the sunroof can be closed so the passengers remain dry. To work effectively in the rain, sunroofs come equipped with seals so as to prevent water from leaking in on the passengers while closed. However, the construction of a sunroof can create a depression in the roof of the vehicle that will potentially allow water to accumulate. To avoid the accumulation of water, a vent can be provided that allows the water to drain away. The vent can be connected via a hose to a drain hole in the vehicle body so the water that might otherwise accumulate can be safely removed from the depression created by the sunroof. In this manner, the opening of the sunroof will not cause a sudden deluge of water to fall on the occupants of the vehicle. Somewhat similarly, an air conditioning system tends to remove moisture from the air and the resultant water must be directed outside the vehicle or the water will puddle on the floor and/or potentially splash the occupants. To remove the water, a hose typically directs the water that accumulates in an evaporator case through a hole in a dash panel.

While these methods of removing unwanted water are mostly successful, they tend to cause an undesirable side effect. Vehicle designers are constantly trying to make their vehicles quieter and substantial effort and money is exerted to prevent the intrusion of exterior sounds into the passenger compartment. For example, sound absorbing materials and seals are used on a number of panels including the floor panels, the dash panels, the roof panel and the door panels. Unfortunately, any hole in a panel that forms the passenger compartment is a potential avenue for noise to enter the passenger compartment. Thus, a hole in a panel that allows the water to drain away can also allow undesirable noise to enter the passenger compartment. Therefore, there is a need in the art to help reduce the noise that might otherwise enter the passenger compartment through the drain holes in the panels. The present invention is directed at solving these and other known problems by providing a drain plug that provides for a reduction in the amount of noise entering into the vehicle through the hole in the panel while still permitting the water to drain away.

SUMMARY OF THE INVENTION

A drain plug assembly is provided for mounting to a hole in a panel of a vehicle. The drain plug has a shank with an inlet configured to allow a hose to attach to the drain plug on a first side of the panel. The drain plug mounts to the hole in the panel and includes an outlet that allows water to exit the drain plug on a second side of the panel. A sound blocking element is provided to occlude at least a portion of the outlet so as to reduce the entry of noise into the passenger compartment through the drain plug.

Other features and advantages of the invention will become apparent to those skilled in the art upon review of the following detailed description, claims and drawings in which like numerals are used to designate like features.

Figure 1:
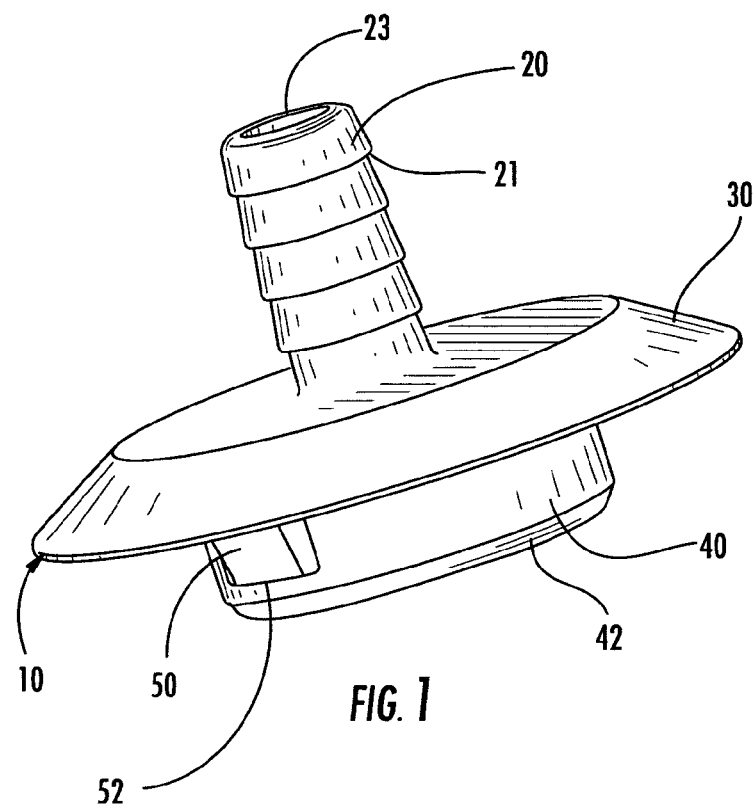
FIG. 1 is an isometric view of an exemplary embodiment of a drain plug.

Before the embodiments of the invention are explained in detail, it is to be understood that the invention is not limited in its application to the details of construction and the arrangement of the components set forth in the following description or illustrated in the drawings. The invention is capable of other embodiments and of being practiced or being carried out in various ways. Also, it is to be understood that the phraseology and terminology used herein are for the purpose of description and should not be regarded as limiting. The use of "including" and "comprising" and variations thereof is meant to encompass the items listed thereafter and equivalents thereof as well as additional items and equivalents thereof.

DETAILED DESCRIPTION OF THE EMBODIMENTS

Figure 6:
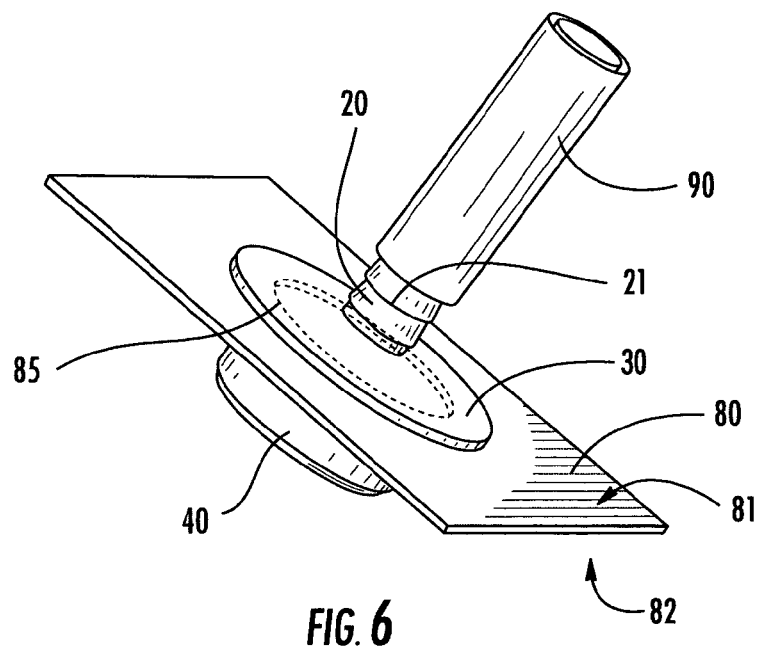
FIG. 6 is an isometric view of an exemplary embodiment of a drain plug installed onto a panel with a connected hose.

Referring to FIGS. 1 and 6, a drain plug 10 includes a shank 20 with an inlet 23, a washer 30 and a cylindrical wall 40. The shank 20 is configured to extend away from a first side of a panel 80 and will accept a hose 90 (FIG. 6). The shank 20 may include a plurality of serrations 21 that aid in preventing the hose 90 from backing off the shank 20 due to vibration. In an alternative embodiment, the plurality of serrations 21 could be eliminated and friction or the use of an adhesive between the hose 90 and the shank 20 could be used to ensure that the hose 90 does not inadvertently back off the shank 20. In yet another embodiment (not shown), a hose can be inserted into the shank as a means of attachment as compared to being pushed onto the shank as shown. As can be appreciated, the inlet 23 allows the water to move from the hose into the drain plug 10. It is noted that the drain plug can be used to drain or vent any type of liquid or gas, not just water as specifically discussed herein.

The cylindrical wall 40 includes a chamfer 42. The chamfer 42 is configured to aid in the insertion of the drain plug 10 in a hole 85 in the panel 80 (FIG. 6). In this regard, it should be noted that the cylindrical wall 40 may be configured so as to avoid the need to deflect the edge of the hole 85 during installation, thus reducing the installation force required. Although, if a tighter fit is desired, cylindrical wall 40 can be slightly larger than the mating hole 85 in the panel 80.

As depicted in FIG. 1, a retainer 50 is mounted to the cylindrical wall 40. The retainer 50 may be mounted to the cylindrical wall 40 via a flexible link 52 that is similar in construction to a known living hinge. Thus, when the drain plug 10 is inserted into the hole 85 in the panel 80, the retainer 50 will flex inward from a first position toward a second position and once the drain plug 10 is fully inserted, the retainer 50 will return to the first position, thereby snap fitting the drain plug 10 to the hole 85. Therefore, once the drain plug 10 is installed, the retainer 50 will prevent the drain plug 10 from becoming disengaged from the hole 85.

Figure 2:
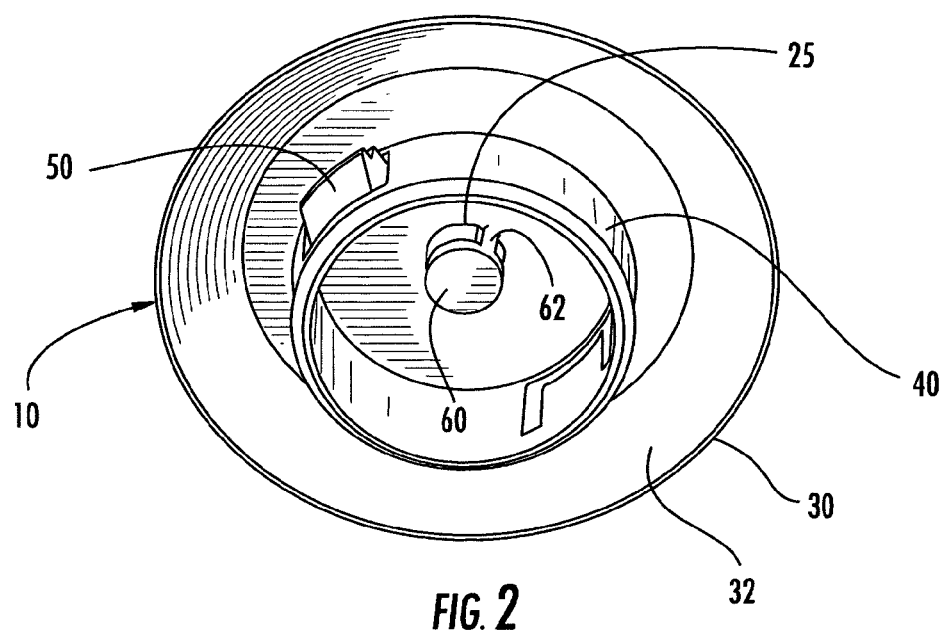
FIG. 2 is an isometric view of the bottom of the drain plug depicted in FIG. 1.

Turning to FIG. 2, a bottom view of the drain plug 10 depicted in FIG. 1 is illustrated. The drain plug 10 includes an outlet 25 that allows water to drain away on an outer or a second side 82 of the panel 80 (FIG. 6). To aid in the prevention of sound entering through the outlet 25, a disc 60 is mounted to the washer 30 via two arms 62 (one of which is shown). As shown, the disc 60 completely occludes the outlet 25, however the disc 60 could be made so as to partially or substantially occlude the outlet 25 while still providing similar benefits. The complete occlusion, however, in conjunction with the cylindrical walls 40, helps prevent sound from directly entering the outlet 25.

It should be noted that while depicted as circular, the disc 60 can be any other shape such as rectangular, hexagon and the like. In addition, the disc need not be flat as depicted, thus the depicted disc 60 is merely one embodiment of a disc which is an example of a sound blocking element. The sound blocking element can be supported via one or more arms 62. If constructed as depicted, however, the disc 60 can provide benefits during the manufacturing process due to the ability to readily produce such a part with an injection molding process.

As can be appreciated from FIG. 2, more than one retainer 50 may be mounted to the cylindrical wall 40. As depicted, two retainers 50 may be positioned opposite each other. While not required, such an arrangement aids in the manufacture of the drain plug 10 if it is to be formed of a single piece. Such arrangement also helps to ensure the drain plug 10 mounts evenly to the panel 80 (FIG. 6).

The washer 30 includes an inner surface 32 that is configured to engage the surface (e.g., panel 80) on which the drain plug 10 is mounted. The inner surface 32 has a concaved shape. While not required, such a shape allows the washer 30 to move between a first, relaxed position to a second, flexed position when installed (see FIG. 6). This flexibility helps the drain plug 10 mount to holes in panels of varying thicknesses.

Figure 3:
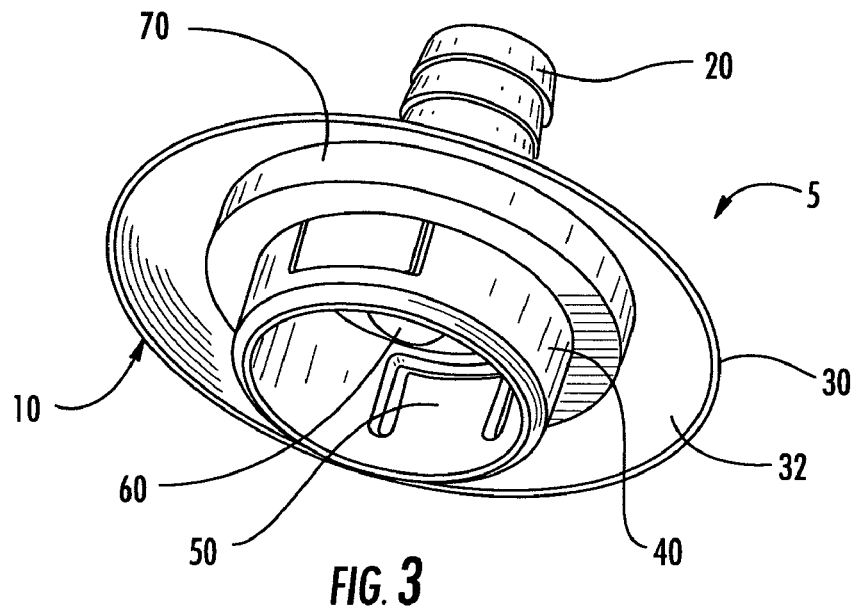
FIG. 3 is an isometric view of an exemplary embodiment of a drain plug assembly.

Looking at FIG. 3, an embodiment of a drain plug assembly 5 is illustrated. The drain plug 10 includes the shank 20 mounted to the washer 30. The cylindrical wall 40 is mounted to the washer 30 and includes two retainers 50. The disc 60 is provided to occlude the outlet 25 as discussed above (see FIG. 2).

In addition, as depicted, a seal 70 is mounted to the inner surface 32 of the washer 30 and is configured to extend around the cylindrical wall 40. Thus, the seal 70 can be considered to be mounted around the cylindrical wall 40. In operation, the seal 70 seals the drain plug 10 to the mounting surface. As depicted, the seal 70 covers a portion of the retainer 50 prior to installation of the drain plug assembly 5.

It should be noted that one could configure the drain plug to mount to different panels of different thicknesses by providing different seals 70 having different thicknesses. Thus, when mounting to a thinner panel, a thicker seal 70 could be provided to help the washer seal to the mounting surface.

Figure 4:
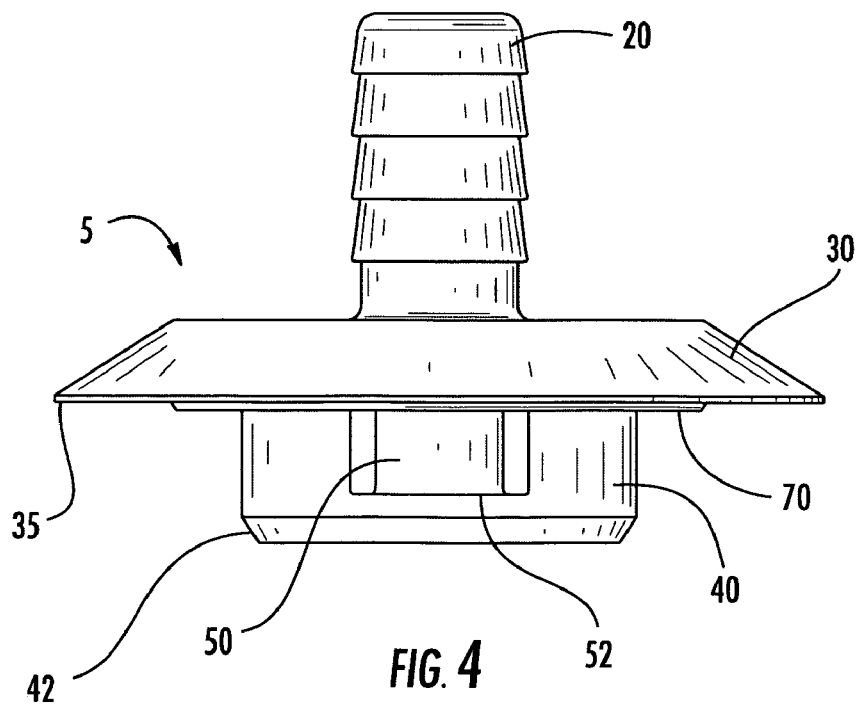
FIG. 4 is a side view of the drain plug assembly depicted in FIG. 3.

Turning to FIG. 4, a side view of the embodiment of the drain plug assembly 5 depicted in FIG. 3 is illustrated. As can be appreciated, the shank 20 extends from a first side of the washer 30 and the cylindrical wall 40 extends from a second side of the washer 30. Therefore, when installed, the cylindrical wall 40 will extend from one side of the mounting surface and the shank 20 will extend from the other. As depicted, the seal 70 extends below an outer edge 35 of the washer 30. While depicted as mounted close to the cylindrical wall 40, the seal 70 could be mounted closer to or on the outer edge 35.

Depending on the material used to form the seal 70 and the design of the washer 70, the seal 70 may become compressed when the drain plug assembly 5 is installed. Materials such as closed cell foams may be used as a compressible seal. Other materials that tend to compress less effectively may also be used as a seal. Preferably, the seal 70 will act to substantially seal the drain plug 10 to the vehicle panel to prevent the entrance of noise and moisture around the outer edge 35 and/or to dampen vibrations that might otherwise cause a noise.

Figure 5:
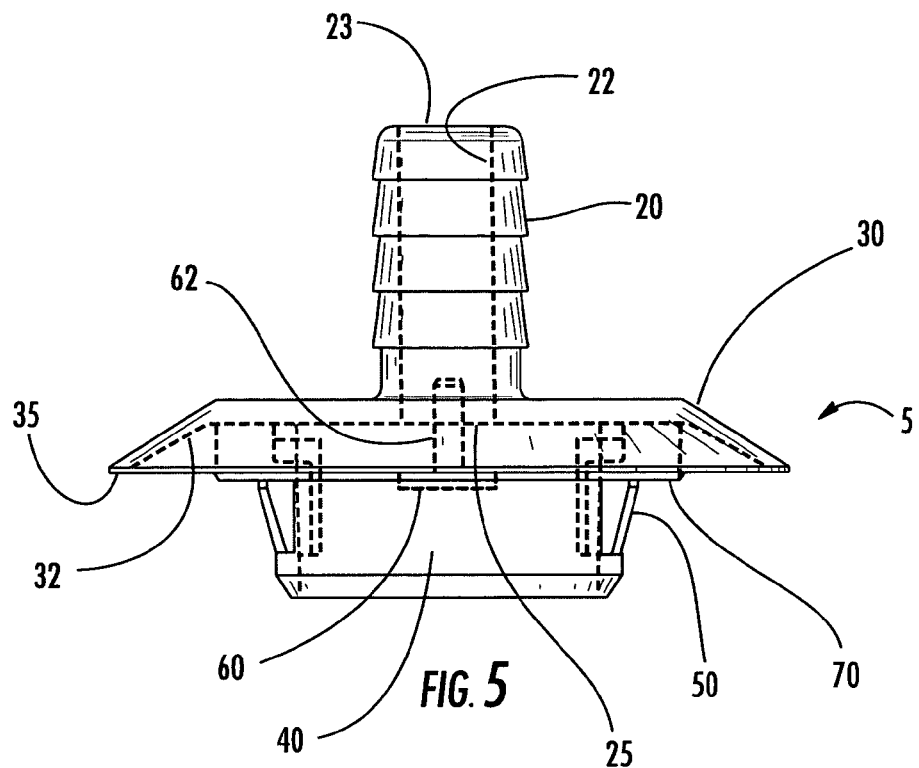
FIG. 5 is a front view of the drain plug assembly depicted in FIG. 4.

FIG. 5 depicts a front view of the assembly depicted in FIG. 4. To illustrate additional features, however, portions of the drain plug assembly 5 are shown in dotted line. As depicted, the shank 20 includes an inner diameter 22 that extends from the inlet 23 to the outlet 25. The disc 60 may be mounted via at least one arm 62 to the washer 30 to occlude the outlet 25. Mounted around the cylindrical wall 40 is the seal 70. In an embodiment, the seal 70 can be adhesively fastened to the inner surface 32 of the washer 30.

As depicted, the washer 30 has a wall thickness that is made visible by the inclusion of the dotted line depiction of the inner surface 32. As can be appreciated, the wall thickness varies and becomes thinner toward the outer edge 35 of the washer 30. While not required, the depicted variation in thickness helps allow the washer 30 to flex during installation.

Turning to FIG. 6, an isometric view of the drain plug 10 installed on the panel 80 is illustrated. The shank 20 extends from a first side 81 of the panel 80 and the cylindrical wall 40 extends from a second side 82 of the panel 80. The depicted washer 30 is shown in the flexed position. The hole 85 in the panel 80 is shown in dotted line. In addition, the hose 90 is shown installed on the shank 20.

As depicted, the hose 90 is not inserted all the way on the shank 20. Depending on the design of the hose 90 and the shank 20, it may be desirable to insert the hose 90 until it bottoms out on the washer 30. Such an installation will tend to reduce the chance of the hose 90 becoming unattached from the shank 20. However, the inclusion of the serrations 21 allows greater assembly latitude because the serrations 21 decrease the likelihood of the hose 90 becoming unattached over time.

During installation, the cylindrical wall 40 is positioned in the hole 85 and then snap-fit to the hole 85 through the use of retainers 50 so that the drain plug 10 stays in the installed position. Because the seal 70 (FIG. 3) can be provided around the cylindrical wall 40 to seal the drain plug 10 to the panel 80, it is beneficial that the drain plug 10 engage the hole 85 in an even manner so that the seal 70 is under relatively uniform compression. This will help prevent undesirable gaps in the seal between the washer 30 and the panel 80.

It should be noted that while circular holes are preferable because they have less of a perimeter for a given area and are simple to manufacture, other shaped holes such as square or triangular holes can be used. In such a situation, the cylindrical wall 40 preferably will be shaped to fit the holes. Accordingly, the cylindrical wall 40 need not have a circular shape.

While not visible in FIG. 6, one or more retainers can be mounted to the cylindrical wall 40 so as to hold the drain plug 10 in place once installed. The retainer could be as depicted above in FIG. 2, could be a thread configured to engage the hole 85, or could include other known retaining designs. In an alternative embodiment, the drain plug 10 can be secured in position through the use of an adhesive. For example, the seal 70 (FIG. 3) could include adhesive features that would help retain the drain plug in position. An advantage of the flexing type of retainer as depicted in FIG. 2, however, is that it is unlikely to become loosened over time due to vibrations.

One of the advantages of the configuration depicted in FIGS. 1-6 is that it can be injection molded and formed out of a single piece of relatively hard plastic instead of a rubber or an elastomer, or other more costly materials. While such a construction is not required, the use of a plastic material that can be injection molded provides a benefit in the reduction of manufacturing costs and also provides benefits in the retention of the hose, as compared to a more flexible material.

Variations and modifications of the foregoing are within the scope of the present invention. It should be understood that the invention disclosed and defined herein extends to all alternative combinations of two or more of the individual features mentioned or evident from the text and/or drawings. All of these different combinations constitute various alternative aspects of the present invention. The embodiments described herein explain the best modes known for practicing the invention and will enable others skilled in the art to utilize the invention. The claims are to be construed to include alternative embodiments to the extent permitted by the prior art.

Various features of the invention are set forth in the following claims.

What is claimed is:

1. A drain plug for use in mounting to a hole, the drain plug comprising:
    a shank, the shank having an inlet and an outlet configured to provide a continuously open passageway therebetween;
    a washer mounted to the shank;
    a cylindrical wall extending from the washer; and
    a sound blocking element mounted inside the cylindrical wall, the sound blocking element configured to occlude a substantial portion of the outlet without closing the passageway, the sound blocking element being a disc supported by at least one arm;
    wherein the shank, the washer, the cylindrical wall and the sound blocking element are formed of a single piece of material.

2. The drain plug as set forth in claim 1, wherein the disc being supported by two arms.

3. The drain plug as set forth in clam 2, further comprising a first retainer, the first retainer configured to hold the drain plug in position when the drain plug is installed.

4. The drain plug as set forth in claim 3, wherein the shank is serrated.

5. The drain plug as set forth in claim 4, wherein the drain plug further comprises a second retainer configured to hold the drain plug in position, the second retainer positioned opposite the first retainer, the first and second retainers mounted to the cylindrical wall via a first and second flexible link.

6. The drain plug set forth in claim 1, wherein the drain plug is formed of a single piece of plastic and the drain plug further comprises a retaining means.

7. A drain plug assembly for use in mounting a hose to a hole in a panel, the assembly comprising:
    a drain plug, the drain plug comprising:
        a shank configured to accept the hose, the shank having an inlet;
        a washer mounted to the shank;
        a cylindrical wall extending from the washer;
        an outlet;
        a continuously open passageway extending between the inlet and the outlet;
        a sound blocking element mounted inside the cylindrical wall, the sound blocking element configured to substantially occlude the outlet, without closing the passageway, the sound blocking element being a disc supported by at least one arm;
        a first retainer mounted to the cylindrical wall, the first retainer configured in operation to secure the drain plug in place when the drain plug is installed in the hole;
        wherein the shank, the washer, the cylindrical wall, the sound blocking element and the first retainer are formed of a single piece of material; and
    a seal mounted around the cylindrical wall.

8. The drain plug assembly as set forth in claim 7, wherein the seal is secured to the drain plug through the use of an adhesive.

9. The drain plug assembly as set forth in claim 7, wherein the shank is serrated.

10. The drain plug assembly as set forth in claim 9, further comprising a second retains mounted to the cylindrical wall.

11. The drain plug assembly as set forth in claim 10, wherein the sound blocking element is a disc supported by two arms.

12. The drain plug assembly as set forth in claim 11, wherein the first and second retainers are mounted to the cylindrical walls through a first and second flexing link, respectively, the first retainer being positioned opposite the second retainer.

13. The drain plug assembly as set fort in claim 12, wherein the washer is shaped in a flexible concave manner and the seal is compressible.

14. The drain plug assembly as set forth in claim 13, wherein the washer has a varying wall thickness, the wall thickness decreasing towards an outer edge of the washer.

15. A drain plug for use in mounting to a hole in a vehicle panel, the drain plug comprising:
    a single monolithic body having:
        a washer for mounting to the panel, the washer having a first and a second side;
        a shank extending from the first side of the washer, the shank having an inlet, the inlet fluidly coupled to an outlet on the second side of the washer;
        a passageway extending between the inlet and the outlet;
        a cylindrical wall extending from the second side of the washer and around the outlet; and
        a disc, the disc configured to occlude the outlet without closing the passageway, wherein the disc is mounted to the washer by at least one arm so as to be spaced away from the second side of the washer, the disc and the at least one arm configured to provide an opening between the disc and the second side of the washer that is in open communication with the passageway.

16. The drain plug as set forth in claim 15, wherein the shank includes at least one serration.

17. The drain plug as set forth in claim 15, wherein the disc is mounted to the washer by two arms.

18. The drain plug as set forth in claim 15, wherein the disc partially occludes the outlet.

19. The drain plug as set forth in claim 15, wherein the disc is circular.

20. The drain plug as set forth in claim 15, wherein the washer has a concave shape with a tapered wall thickness and is configured to flex from a first position to a second position when installed.

* * * * *